| United States Patent [19] | [11] | 4,262,113 |
|---|---|---|
| Jaquiss et al. | [45] | Apr. 14, 1981 |

[54] PROCESS FOR PREPARING POLYCARBONATES USING AMINO GUANIDINE OR AMINO AMIDINE CATALYSTS

[75] Inventors: Donald B. G. Jaquiss, New Harmony; Victor Mark, Evansville, both of Ind.

[73] Assignee: General Electric Company, Pittsfield, Mass.

[21] Appl. No.: 107,895

[22] Filed: Dec. 28, 1979

[51] Int. Cl.$^3$ ............................................... C08G 63/62
[52] U.S. Cl. ..................................... 528/199; 528/126; 528/175; 528/182; 528/198
[58] Field of Search ............... 528/199, 198, 126, 175, 528/182

[56] References Cited

U.S. PATENT DOCUMENTS 3,763,099  10/1973  Jaquiss .................................. 528/199

*Primary Examiner*—Harold D. Anderson

[57] ABSTRACT

An interfacial polymerization process for preparing high molecular weight aromatic polycarbonates by reacting a dihydric phenol with a carbonate precursor in the presence of a catalytic amount of an amino amidine or amino guanidine.

5 Claims, No Drawings

PROCESS FOR PREPARING POLYCARBONATES USING AMINO GUANIDINE OR AMINO AMIDINE CATALYSTS

This invention is directed to an interfacial polymerization process for preparing high molecular weight aromatic polycarbonates which comprises reacting, under interfacial polycarbonate-forming conditions, a dihydric phenol and a carbonate precursor in the presence of a catalytic amount of an amino amidine or amino guanadine.

BACKGROUND OF THE INVENTION

Polycarbonates are well known thermoplastic materials finding a wide range of uses, particularly for injection molding applications and as glazing sheet for replacement of window glass. The interfacial polymerization technique, which is one of the methods employed in preparing a polycarbonate, in general comprises reacting a dihydric phenol and a carbonate precursor in the presence of an aqueous caustic solution containing an alkali or alkaline earth metal hydroxide and an inert organic solvent medium which is a solvent for the polycarbonate as it is formed. While the interfacial polymerization process is generally effective in producing polycarbonates, it suffers from two general disadvantages. Firstly, the rate of reaction is relatively slow. Secondly, there is difficulty in producing high molecular weight aromatic polycarbonates; i.e., those having a weight average molecular weight of about 15,000 or greater. Many techniques, such as those employing ultrasonic waves during the reaction, have been employed to remedy these two disadvantages. These techniques have not always proved to be entirely effective and involve the use of cumbersome and expensive equipment. It is advantageous economically to speed up the reaction and to produce high molecular weight aromatic polycarbonates without having to employ extra equipment or more severe reaction conditions. One such method is the use of catalysts in the interfacial polymerization process.

However, relatively little is known about effective catalysis of polycarbonate reactions. The prior art discloses that certain compounds such as tertiary and quaternary amines and their salts (U.S. Pat. No. 3,275,601), guanidine compounds (U.S. Pat. No. 3,763,099), and ammonia and ammonium compounds (U.S. Pat. No. 4,055,544) are effective catalysts for the interfacial polymerization process for producing polycarbonates. However, the prior art also teaches that certain organic nitrogen compounds function as molecular weight regulators or chain terminators in the polycarbonate reactions. Thus, the afore-mentioned U.S. Pat. No. 3,275,601 discloses that aniline and methyl aniline function as chain terminators in the polycarbonate reaction, while U.S. Pat. No. 4,001,184 discloses that primary and secondary amines are effective molecular weight regulators. Furthermore, U.S. Pt. No. 4,111,910 discloses that ammonia, ammonium compounds, primary amines, and secondary amines function as chain terminators in the formation of polycarbonates via the interfacial polymerization process, and U.S. Pat. No. 3,223,678 discloses that monoethanolamine and morpholine act to break the polycarbonate chain thereby resulting in lower molecular weight polycarbonates.

SUMMARY OF THE INVENTION

This invention is directed to an interfacial polymerization process for producing high molecular weight aromatic carbonate polymers wherein a dihydric phenol is reacted with a carbonate precursor in the presence of an aqueous caustic solution containing an alkali metal or alkaline earth metal hydroxide and a catalyst which is an amino amidine or amino guanidine.

The reaction of a dihydric phenol such as 2,2-bis(4-hydroxyphenyl)propane with a carbonate precursor such as phosgene results in a high molecular weight aromatic polycarbonate polymer consisting of dihydric phenol derived units bonded to one another through carbonate linkages. The reaction is carried out in the presence of an aqueous caustic solution containing an alkali or alkaline earth metal hydroxide as the acid acceptor and an inert organic solvent medium which is a solvent for the polycarbonate as it is formed. Generally, a molecular weight regulator is also present to control the molecular weight of the polycarbonate polymer. In the process of the present invention, an amino amidine or amino guanidine is present and acts as an effective catalyst to speed up the reaction between the carbonate precursor and the dihydric phenol.

The high molecular weight aromatic carbonate polymers produced in accordance with the practice of this invention include carbonate homopolymers of dihydric phenols or carbonate copolymers of two or more different dihydric phenols. Additionally, the production of high molecular weight thermoplastic randomly branched polycarbonates and copolyester-polycarbonates are included within the scope of this invention. The randomly branched polycarbonates are prepared by coreacting a polyfunctional organic compound with the afore-described dihydric phenol and carbonate precursor.

The dihydric phenols that can be employed in the practice of this invention are known dipydric phenols in which the sole reactive groups are the two phenolic hydroxyl groups. Some of these are represented by the general formula

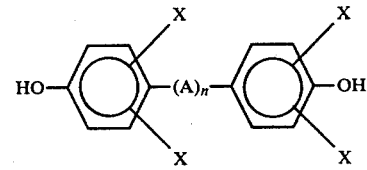

wherein A is a divalent hydrocarbon radical containing 1–15 carbon atoms, —S—, —S—S—,

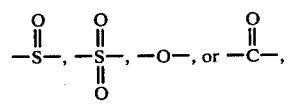

X is independently selected from the group consisting of hydrogen, halogen, or a monovalent hydrocarbon radical such as alkyl group of 1–4 carbons, an aryl group of 6–10 carbons such as phenyl, tolyl, xylyl, naphthyl, an oxyalkyl group of 1–4 carbons or an oxyaryl group of 6–10 carbons and n is 0 or 1.

Typical of some of these dihydric phenols are bisphenols such as bis(4-hydroxyphenyl)methane, 2,2-bis(4-hydroxyphenol)propane (also known as bisphenol-A), 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, etc., dihydric phenol ethers such as bis(4-hydroxyphenyl) ether, bis(3,5-dichloro-4-hydroxyphenyl)ether, etc.; dihydroxydiphenyls such as p,p'-dihydroxydiphenyl, 3,3'-dichloro-4,4'-dihydroxydiphenyl, etc.; dihydroxyaryl sulfones such as bis(4-hydroxyphenyl)sulfone, bis(3,5-dimethyl-4-hydroxyphenyl)sulfone, etc., dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene, etc., and dihydroxy diphenyl sulfides and sulfoxides such as bis(4-hydroxyphenyl)sulfide and bis(4-hydroxyphenyl)sulfoxide, bis-(3,5-dibromo-4-hydroxyphenyl)sulfoxide, etc. A variety of additional dihydric phenols are also available and are disclosed in U.S. Pat. Nos. 2,999,835, 3,028,365 and 3,153,008, all of which are incorporated herein by reference. It is, of course, possible to employ two or more different dihydric phenols or a copolymer of a dihydric phenol with glycol or with hydroxy or acid-terminated polyester, or with a dibasic acid in the event a polycarbonate copolymer or interpolymer rather than a homopolymer is desired for use in the preparation of the polycarbonate polymers of this invention. Blends of any of the above dihydric phenols can also be employed, the preferred dihydric phenol being bisphenol-A.

The polyfunctional organic compounds which may be included within the scope of this invention are set forth in U.S. Pat. Nos. 3,635,895 and 4,001,184, which are incorporated herein by reference. These polyfunctional aromatic compounds contain at least three functional groups which are carboxyl, carboxylic anhydride, haloformyl or mixtures thereof. Examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride or trimellitic acid or their haloformyl derivatives. Also included herein are blends of a linear polycarbonate and a branched polycarbonate.

The carbonate precursor can be either a carbonyl halide or a bishaloformate. The carbonyl halides include carbonyl bromide, carbonyl chloride, and mixtures thereof. The bishaloformates suitable for use include the bishaloformates of dihydric phenols such as bischloroformates of 2,2-bis(4-hydroxyphenyl)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

By adding monofunctional compounds with are capable of reacting with phosgene or with the end groups of the polycarbonates consisting of the chlorocarbonic acid ester group and which terminate the chains, such as the phenols, e.g., phenol, tertbutylphenyl, cyclohexylphenol, and 2,2-(4,4-hydroxyphenylene-4'-methoxyphenylene)propane, aniline and methylaniline, it is possible to regulate the molecular weight of the polycarbonates.

As mentioned hereinabove, the acid acceptor can be an alkali or alkaline earth metal hydroxide. Illustrative of these acid acceptors are sodium hydroxide, lithium hydroxide, potassium hydroxide, calcium hydroxide, and the like. The amount of acid acceptor present should be sufficient to maintain the pH of the aqueous caustic solution above about 9.

Illustrative of the inert organic solvents which are present during the reaction and which dissolve the polycarbonate as it is formed are aromatic hydrocarbons and halogenated hydrocarbons such as benzene, toluene, xylene, chlorobenzene, orthodichlorobenzene, chloroform, methylene chloride, carbon tetrachloride, trichloroethylene and dichloroethane. The solvent is present in an amount effective to solubilize or dissolve substantially all of the polycarbonate as it is formed.

One of the catalytic compounds within the scope of the instant invention are the amino amidines which are represented by the general formulae

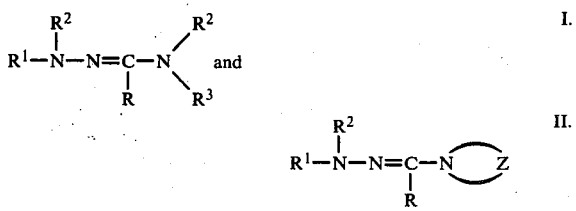

wherein R and $R^2$ are independently selected from hydrogen, alkyl, substituted alkyl, alkenyl, substituted alkenyl, cycloalkyl, substituted cycloalkyl, aryl, substituted aryl, alkaryl, and aralkyl radicals; $R^1$ is selected from alkyl, substituted alkyl, alkenyl, substituted alkenyl, cycloalkyl, substituted cycloalkyl, aryl, substituted aryl, alkaryl, aralkyl; acyl radicals represented as R—C-(O)— wherein R is as defined above and substituted acyl radicals; $R^3$ is selected from alkyl, substituted alkyl, alkenyl, substituted alkenyl, cycloalkyl, substituted cycloalkyl, aryl, substituted aryl, aralkyl and alkaryl radicals; and Z is a divalent aliphatic hydrocarbon radical containing from 2 to 7 carbon atoms completing a 3 to 8 membered ring, preferably Z is a divalent saturated aliphatic hydrocarbon radical containing from 2 to 7 carbon atoms completing, in conjunction with the nitrogen, a 3 to 8 membered ring.

The amino guanidine catalyst compounds of the invention are represented by the general formula III, IV and V

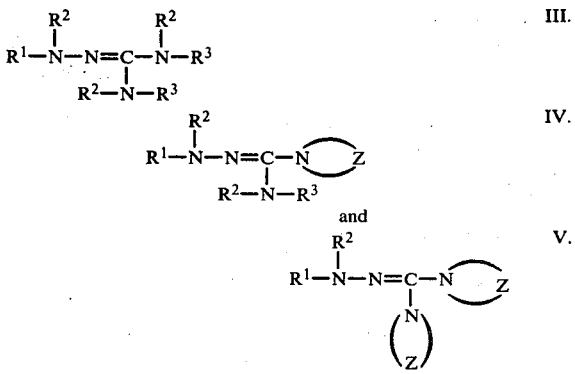

wherein $R$-$R^3$ and Z are as defined above.

Preferred alkyl radicals are those containing from 1 to about 20 carbon atoms such as methyl, ethyl, n-propyl, iso-propyl, n-butyl, iso-butyl, sec-butyl, tert-butyl, n-pentyl and various positional isomers thereof, as well as the straight and branched chain positional isomers of hexyl, heptyl, octyl, nonyl, decyl and the like.

Preferred alkenyl radicals are those containing from 2 to about 20 carbon atoms such as vinyl, propenyl, allyl, butenyl, 2-methylpropenyl, 3-octenyl, and the like.

Preferred cycloalkyl radicals are those containing from 3 to about 14 carbon atoms such as cyclopropyl, cyclobutyl, cyclopentyl, cyclohexyl, cycloheptyl, cyclooctyl, cyclononyl, dimethylcyclohexyl, propylcyclohexyl, and the like.

Preferred aryl radicals are those containing from 6 to 18 carbon atoms such as phenyl, naphthyl and anthracyl.

Preferred aralkyl radicals are those containing from 7 to about 20 carbon atoms such as benzyl, 2-phenylethyl, 2-phenylpropyl, cumyl, phenylbutyl, naphthylmethyl, and the like.

Preferred alkaryl radicals are those containing from 7 to about 20 carbon atoms such as tolyl, 2,3-xylyl, 2,4-xylyl, p-ethylphenyl, 2-methyl-1-naphthyl, and the like.

Preferred acyl radicals are those containing from 1 to about 20 carbon atoms such as formyl, acetyl, propanoyl, dodecanoyl, benzoyl, 1-naphtoyl, 2-naphtoyl, pivaloyl, and the like.

When substituent groups are present on the aforedescribed radicals, they are preferably selected from the group consisting of alkyl, hydroxyl, and alkoxy radicals.

Illustrative amino amidines represented by formulae I and II are set forth in Table I below:

TABLE I

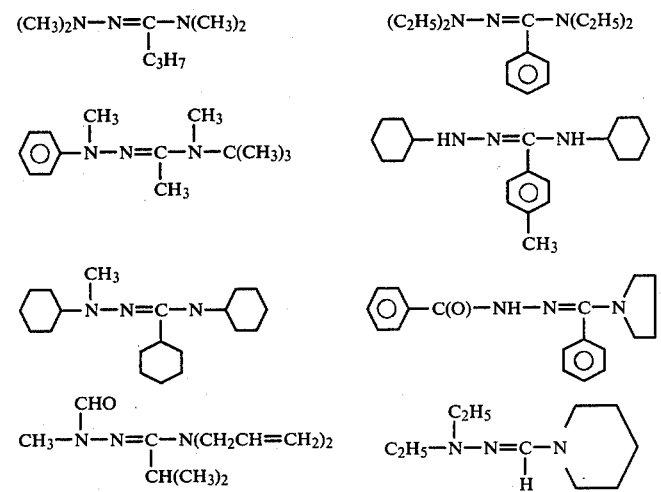

The amino amidines employed can be prepared from the appropriate hydrazines by the general methods used for the synthesis of amidines as discussed in *Open-Chain Nitrogen Compounds*, by P. A. S. Smith, W. A. Benjamin Publishers, 1965, pp. 177–184, and in the survey article by R. L. Schriner and F. W. Newmann in *Chemical Reviews*, Vol. 35, pp. 351–425 (1944).

Illustrative amino guanidines represented by formulae III–V are set forth in Table II below:

TABLE II

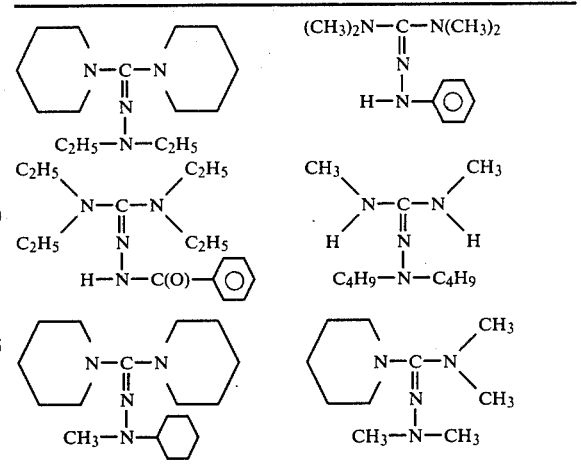

The amino guanidines employed can be prepared from the appropriate hydrazines by the general methods used for the synthesis of guanidines, as discussed by P. A. S. Smith in *Open-Chain Nitrogen Compounds*, Vol. 1, pp. 281–2, (1965), W. A. Benjamin Publishers.

The amount of the amino amidine or amino guanidine catalyst present during the reaction is a catalytic amount. By catalytic amount is meant that amount which is effective to catalyze the reaction between the dihydric phenol and the carbonate precursor to produce the high molecular weight polycarbonate. Generally, this amount ranges from about 0.01 to about 10 weight percent based on the weight of the dihydric phenol present; e.g., bisphenol-A.

The temperature at which this reaction proceeds can vary from below 0° C. to about 100° C. The reaction proceeds satisfactorily at temperatures ranging from about room temperature (25° C.) to about 50° C. Since the reaction is exothermic, the rate of carbonate precursor addition can be used to control the reaction temperature. The amount of carbonate precursor, such as phosgene, required will generally depend upon the amount of dihydric phenol present. Generally, one mole of the carbonate precursor will react with one mole of dihydric phenol to provide the polycarbonate. When a carbonyl halide, such as phosgene, is used as the carbonate precursor, two moles of hydrohalic acid such as HCl are produced by the above reaction. These two moles of acid are neutralized by the alkali or alkaline earth metal hydroxide acid acceptor present. The foregoing are herein referred to as stoichiometric or theoretical amounts.

PREFERRED EMBODIMENT OF THE INVENTION

The following examples are set forth to more fully and clearly illustrate the present invention. Although they represent the best mode currently known for carrying out the process of the invention, these examples should be considered as being illustrative rather than limiting the invention. In the examples, all parts and percentages are by weight unless otherwise specified.

EXAMPLE 1

This example illustrates an unsuccessful attempt to prepare a high molecular weight aromatic polycarbonate polymer via the interfacial polymerization technique without the presence of a catalyst.

To a reactor fitted with a reflux condenser and a mechanical agitator, there was charged 57 parts of 2,2-bis(4-hydroxyphenyl) propane, 57 parts of water, 325 parts of methylene chloride, and 1.2 parts of para-tertiarybutylphenol. Phosgene was then added to the reaction mixture at a rate of 0.65 part per minute for a period of 30 minutes while maintaining the pH at 9 by the addition of a 15% aqueous sodium hydroxide solution. After 30 minutes, the pH was raised to 11.0 by the use of additional amounts of sodium hydroxide solution. Phosgenation was continued for a further 10 minutes at this pH. The material recovered from the reaction was found to have an intrinsic viscosity of 0.12 dl/g. This indicated that the degree of polymerization was not sufficient for practical applications, the I.V. being measured in methylene chloride at 25° C.

EXAMPLE 2

This example illustrates the use of one of the catalysts of the invention following the process of Example 1.

To a reactor fitted with a reflux condenser and a mechanical agitator there was charged 57 parts of 2,2-bis(4-hydroxyphenyl) propane, 157 parts of water, 325 parts of methylene chloride, 1.2 parts of para-tert-butylphenol and 0.8 part of 2-(dimethyl)amino-1,1,3,3-tetramethylguanidine. Phosgene was then added to this reaction mixture at a rate of 0.65 part per minutes for a period of 30 minutes while maintaining the pH at 9 by the addition of a 15% aqueous sodium hydroxide solution. After 30 minutes, the pH was raised to 13.0 by the use of additional amounts of sodium hydroxide solution. Phosgenation was continued for an additional 10 minutes at this pH.

The polycarbonate recovered from solution was dried and was found to have an intrinsic viscosity of 0.46 dl/g. This indicated the formation of a high molecular weight aromatic polycarbonate.

EXAMPLES 3–6

The procedure of Example 2 was substantially repeated for each of the examples of 3–6 except that the aminoguanidine catalysts listed in Table III were substituted, in the amounts shown, for the catalyst of Example 2. The intrinsic viscosities of the recovered polycarbonates are also displayed in Table III.

TABLE III

| Example No. | Aminoguanidine Catalyst | Parts by Weight | Intrinsic Viscosity dl/g |
|---|---|---|---|
| 3 | 2-Anilino-1,1,3,3-bis(pentamethylene)guanidine | 1.0 | 0.43 |
| 4 | 2-Benzoylimino-1,1,3,3-tetramethylguanidine | 0.8 | 0.37 |
| 5 | 2-Anilino-1,1,3,3-tetramethylguanidine | 0.8 | 0.41 |
| 6 | 2-(N-methylcyclohexylamino)-1,1,3,3-tetraethylguanidine | 1.0 | 0.44 |

EXAMPLES 7–14

The procedure of Example 2 was substantially repeated for each of the examples 7–14, except that the aminoamidine catalysts listed in Table IV were substituted, in the amounts shown, for the catalyst of Example 2. The intrinsic viscosities of the recovered polycarbonates are also shown in Table IV.

TABLE IV

| Example No. | Aminoamidine Catalyst | Parts by Weight | Intrinsic Viscosity dl/g |
|---|---|---|---|
| 7 | N,N,N'-Trimethyl-N'-phenylmethanehydrazonamide | 0.8 | 0.38 |
| 8 | N,N',N'-Trimethylbenzenecarbohydrazonamide | 1.2 | 0.40 |
| 9 | N,N'-Dimethyl-N'-phenyl-benzenecarbohydrozonamide | 1.3 | 0.36 |
| 10 | N,N,N',N'-Tetramethyl-benzenecarbohydrazonamide | 1.2 | 0.43 |
| 11 | N,N,N',N'-Tetraethyl-ethanehydrazonamide | 0.8 | 0.48 |
| 12 | N,N,N',N'-Tetramethyl-propanehydrazonamide | 0.7 | 0.48 |
| 13 | N'-Formyl-N,N-dimethyl-N'-phenylmethanehydrazonamide | 1.0 | 0.32 |
| 14 | N'-Benzyl-N'-formyl-N,N-dimethylmethanehydrazonamide | 1.1 | 0.38 |

As can be seen by comparison of Example 1 with Examples 2–14, the use of the amidine catalysts of the invention generally results in the relatively rapid production of high molecular weight aromatic polycarbonates via the interfacial polymerization technique while, in the absence of a catalyst (Example 1), the interfacial polymerization technique is generally ineffective in producing high molecular weight aromatic polycarbonates under substantially identical reaction conditions.

What is claimed is:

1. An interfacial polymerization process for preparing a high molecular weight aromatic polycarbonate which comprises reacting, under interfacial polycarbonate-forming conditions, a dihydric phenol and a carbonate precursor in the presence of a catalytic amount of an amino amidine or amino guanidine catalyst.

2. The process of claim 1 wherein said amino amidine is represented by the general formulae

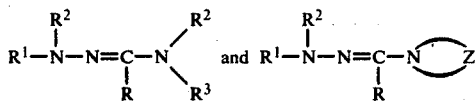

wherein R and $R^2$ are independently selected from the group consisting of hydrogen, alkyl, substituted alkyl, alkenyl, substituted alkenyl, cycloalkyl, substituted cycloalkyl, aryl, substituted aryl, alkaryl, and aralkyl radicals; $R^1$ is selected from the group consisting of alkyl, substituted alkyl, alkenyl, substituted alkenyl, cycloalkyl, substituted cycloalkyl, aryl, substituted aryl, alkaryl, aralkyl; acyl radicals represented by R—C(O) wherein R is as defined above, and substituted acyl radicals; $R^3$ is selected from the group consisting of alkyl, substituted alkyl, alkenyl, substituted alkenyl, cycloalkyl, substituted cycloalkyl, aryl, substituted aryl, aralkyl and alkaryl radicals; and, Z is a divalent aliphatic hydrocarbon containing from 2-7 carbon atoms completing a 3-8 membered ring in conjunction with said nitrogen.

3. The process of claim 1 wherein said amino guanidine is represented by the general formulae

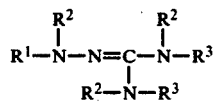

-continued $$R^1-N-N=C-N\underset{R^2-N-R^3}{\overset{R^2}{|}}Z$$

and $$R^1-N-N=C-N\underset{\underset{Z}{N}}{\overset{R^2}{|}}Z$$

wherein R and $R^2$ are independently selected from the group consisting of hydrogen, alkyl, substituted alkyl, alkenyl, substituted alkenyl, cycloalkyl, substituted cycloalkyl, aryl, substituted aryl, alkaryl, and aralkyl radicals; $R^1$ is selected from the group consisting of alkyl, substituted alkyl, alkenyl, substituted alkenyl, cyycloalkyl, substituted cycloalkyl, aryl, substituted aryl, alkaryl, aralkyl; acyl radicals represented by R—C(O) wherein R is as defined above, and substituted acyl radicals; $R^3$ is selected from the group consisting of alkyl, substituted alkyl, alkenyl, substituted alkenyl, cycloalkyl, substituted cycloalkyl, aryl, substituted aryl, aralkyl and alkaryl radicals; and, Z is a divalent aliphatic hydrocarbon containing from 2-7 carbon atoms completing a 3-8 membered ring in conjunction with said nitrogen.

4. The process of claim 1 wherein said dihydric phenol is bisphenol-A and said carbonate precursor is phosgene.

5. The process of claim 1 wherein said amidine is present in from about 0.01 to about 10 weight percent based on the weight of bisphenol-A.

* * * * *